US009692578B2

(12) United States Patent
Meng et al.

(10) Patent No.: US 9,692,578 B2
(45) Date of Patent: Jun. 27, 2017

(54) METHOD FOR CONTROLLING HARQ TIMING IN LTE TELECOMMUNICATION SYSTEM

(71) Applicant: HTC Corporation, Taoyuan County (TW)

(72) Inventors: Ling-San Meng, Taoyuan County (TW); Chih-Hsiang Wu, Taoyuan County (TW)

(73) Assignee: HTC Corporation, Taoyuan (TW)

(*) Notice: Subject to any disclaimer, the term of this patent is extended or adjusted under 35 U.S.C. 154(b) by 64 days.

(21) Appl. No.: 14/497,344

(22) Filed: Sep. 26, 2014

(65) Prior Publication Data

US 2015/0092631 A1   Apr. 2, 2015

Related U.S. Application Data

(60) Provisional application No. 61/883,206, filed on Sep. 27, 2013.

(51) Int. Cl.
*H04B 7/155* (2006.01)
*H04L 5/00* (2006.01)
*H04J 3/00* (2006.01)
*H04L 1/18* (2006.01)
*H04L 5/14* (2006.01)
*H04N 21/647* (2011.01)

(52) U.S. Cl.
CPC ....... *H04L 5/0055* (2013.01); *H04B 7/15557* (2013.01); *H04J 3/00* (2013.01); *H04L 1/18* (2013.01); *H04L 1/1887* (2013.01); *H04L 1/1896* (2013.01); *H04L 5/1469* (2013.01); *H04L 5/0053* (2013.01); *H04L 5/0082* (2013.01); *H04N 21/64776* (2013.01)

(58) Field of Classification Search
CPC ......... H04J 3/00; H04W 72/12; H04L 5/1469; H04L 1/18; H04L 1/1864; H04L 1/1896; H04B 7/15557; H04N 21/64776
See application file for complete search history.

(56) References Cited

U.S. PATENT DOCUMENTS

2013/0188516 A1* 7/2013 He .................. H04W 28/16 370/254
2013/0194981 A1* 8/2013 Wang ................ H04L 1/1671 370/280
2014/0362832 A1* 12/2014 Rudolf ............... H04L 1/1822 370/336

OTHER PUBLICATIONS

3GPP TSG RAN WG1 Meeting #72; "HARQ timing in TDD-eIMTA"; R1-130130; St Julian's, Malta; Jan. 28-Feb. 1, 2013; 3 pages.*

(Continued)

*Primary Examiner* — Andrew Chriss
*Assistant Examiner* — Salvador E Rivas
(74) *Attorney, Agent, or Firm* — CKC & Partners Co., Ltd.

(57) ABSTRACT

A communication method applicable for a LTE TDD system is disclosed. The communication method includes: if a radio frame has a plurality of UL sub-frames, adopting a flexible TTI bundling operation on at least one of the UL sub-frames in the radio frame; and when the radio frame is changed from a first configuration into a second configuration, the HARQ timing for a eNB to transmit ACK/NACK messages for the bundled UL sub-frames is the same as the HARQ timing for the eNB to transmit ACK/NACK messages for the last sub-frame of the bundled UL sub-frames in the second configuration.

4 Claims, 9 Drawing Sheets

(56) References Cited

OTHER PUBLICATIONS

3GPP TSG RAN WG1 Meeting #72; "Reconfiguration signalling and HARQ-timing for TDD eIMTA system"; R1-130370; St Julian's, Malta; Jan. 28-Feb. 1, 2013; 3 pages.*
R1-130130; "HARQ timing in TDD-eIMTA"; R1-130130; St Julian's, Malta; Jan. 28-Feb. 1, 2013; 3 pages.*
3rd Generation Partnership Project, Technical Specification Group Radio Access Network, "Further enhancements to LTE Time Division Duplex (TDD) for Downlink-Uplink (DL-UL) interference management and traffic adaptation", 3GPP TR 36.828 V11.0.0, Jun. 2012.
3rd Generation Partnership Project, Technical Specification Group Radio Access Network, "Physical Channels and Modulation", 3GPP TS 36.211 V11.0.0, Sep. 2012.
3rd Generation Partnership Project, Technical Specification Group Radio Access Network, "Physical Layer Procedures", 3GPP TS 36.213 V11.0.0, Sep. 2012.
3rd Generation Partnership Project, Technical Specification Group Radio Access Network, "Medium Access Control (MAC) protocol specification", 3GPP TS 36.321 V11.0.0, Sep. 2012.
3rd Generation Partnership Project, Technical Specification Group Radio Access Network, "Multiplexing and channel coding", 3GPP TS 36.212 V11.0.0, Sep. 2012.

* cited by examiner

METHOD FOR CONTROLLING HARQ TIMING IN LTE TELECOMMUNICATION SYSTEM

RELATED APPLICATIONS

This application claims the priority benefit of U.S. Provisional Application Ser. No. 61/883,206, filed Sep. 27, 2013, which is herein incorporated by reference.

BACKGROUND

Technical Field

The present disclosure relates to a communication method. More particularly, the present disclosure relates to a LTE TDD communication method.

Description of Related Art

Time division duplex (TDD) offers flexible deployments without requiring a pair of spectrum resources. Currently, LTE (Long Term Evolution) TDD allows for asymmetric downlink-uplink (DL-UL) allocations by providing seven different semi-statically configured DL-UL configurations. These allocations can provide between 40% and 90% DL sub-frames. The semi-static allocation may or may not match the instantaneous traffic situation. The current mechanism for adapting DL-UL allocation is based on the system information change procedure. Additional mechanisms could include, for example, dynamic allocation of sub-frames to UL or DL.

Compared with the system information change procedure, the dynamic mechanisms allow a much shorter period for TDD DL-UL reconfiguration. Such an idea is termed "Further Enhancements to LTE TDD for DL-UL Interference Management and Traffic Adaptation" (eIMTA) in 3GPP. Evaluations in the corresponding study item reveal significant performance benefits by allowing TDD DL-UL reconfiguration based on traffic adaptation in small cells. Furthermore, dynamic signaling mechanisms outperform that using the system information change procedure.

Hybrid automatic repeat request (HARQ) is a transmission technique widely adopted in modem wireless communication systems. HARQ operates by retransmitting an identical copy of the original transmission or another redundancy version upon transmission error. The receiver then combines the previously corrupted transmissions with the retransmitted one.

In LTE TDD systems, the timing relation between the feedback information indicating a transmission error and the corresponding retransmission are separately and differently defined for each of the 7 configurations due to the different allocations of the DL-UL sub-frames. Furthermore, the UL HARQ processes are synchronous, which means that the timing for feedback information and the corresponding retransmissions are fixed instead of being scheduled on-the-fly. As a consequence, dynamic switching among different TDD configurations gives rise to HARQ timing mismatches. Such a mismatch problem could severely affect the transmission performance and degrade the achievable performance gain brought by the dynamic TDD traffic adaptation.

Since the transmit power of UEs (user equipments, for example, mobile devices) are significantly lower than that of the base station, UL coverage enhancement is a fundamental technology employed in LTE systems. The technique of transmission time interval (TTI) bundling bundles together a group of UL sub-frames transmitting the same physical data. The base station can then achieve decoding gain by soft combining the received UL data. Currently, the number of UL sub-frames bundled together in LTE TDD systems is 4. Note that up to 3GPP Rel-11, some of the TDD DL-UL configurations do not support TTI bundling due to the fact that there are less than 4 UL sub-frames in a radio frame. Therefore, in LTE TDD eIMTA system, the technique of TII bundling for enhancing UL coverage cannot be directly applied since the number of UL sub-frames per radio frame changes dynamically in different TDD DL-UL configurations.

SUMMARY

In one aspect, the present disclosure is related to a communication method applicable for a LTE (Long Term Evolution) TDD (Time Division Duplex) system. The communication method includes: if a radio frame has a plurality of UL (uplink) sub-frames, adopting a flexible TTI (transmission time interval) bundling operation on at least one of the UL sub-frames in the radio frame; and after the radio frame is changed from a first configuration into a second configuration, the HARQ (Hybrid Automatic Repeat Request) timing for a eNB (evolved NodeB) to transmit ACK/NACK (Acknowledgmen/Negative-Acknowledgmen) messages for the bundled UL sub-frames is the same as the HARQ timing for the eNB to transmit ACK/NACK messages for the last sub-frame of the bundled UL sub-frames in the second configuration.

In another aspect, the present disclosure is related to a communication method applicable for a LTE TDD system. The communication method includes: if a radio frame has a plurality of UL sub-frames, adopting a flexible TTI bundling operation on at least one of the UL sub-frames in the radio frame; and after the radio frame is changed from a first configuration into a second configuration, in which the first configuration and the second configuration belong to a set of allowed dynamic TDD configurations, the HARQ timing for a eNB to transmit ACK/NACK messages for the bundled UL sub-frames is determined according to a UL HARQ reference TDD configuration corresponding to the set of allowed dynamic TDD configurations.

In still another aspect, the present disclosure is related to a communication method applicable for a LTE TDD system. The communication method includes: if a radio frame has a plurality of UL sub-frames, adopting a flexible TTI bundling operation on at least one of the UL sub-frames in the radio frame; and after the radio frame is changed from a first configuration into a second configuration, the HARQ timing for a eNB to transmit ACK/NACK messages for the bundled UL sub-frames is at a fixed sub-frame regardless of the second configuration.

In yet another aspect, the present disclosure is related to a communication method applicable for a LTE TDD system. The communication method includes: switching a TDD configuration from a first configuration to a second configuration, in which the first configuration supports a TTI bundling operation and the second configuration does not support the TTI bundling operation; and suspending the TTI bundling operation after switching to the second configuration.

By applying the techniques disclosed in the present disclosure, a flexible TTI bundling operation can be adopted to improve the enhancing UL coverage for the UE even when the UE is operating in the TDD configurations that do not support TTI bundling in 3GPP Rel-11. Moreover, the degradation of transmission performance due to HARQ timing mismatches when eIMTA users dynamically switch among different TDD configurations is also resolved.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
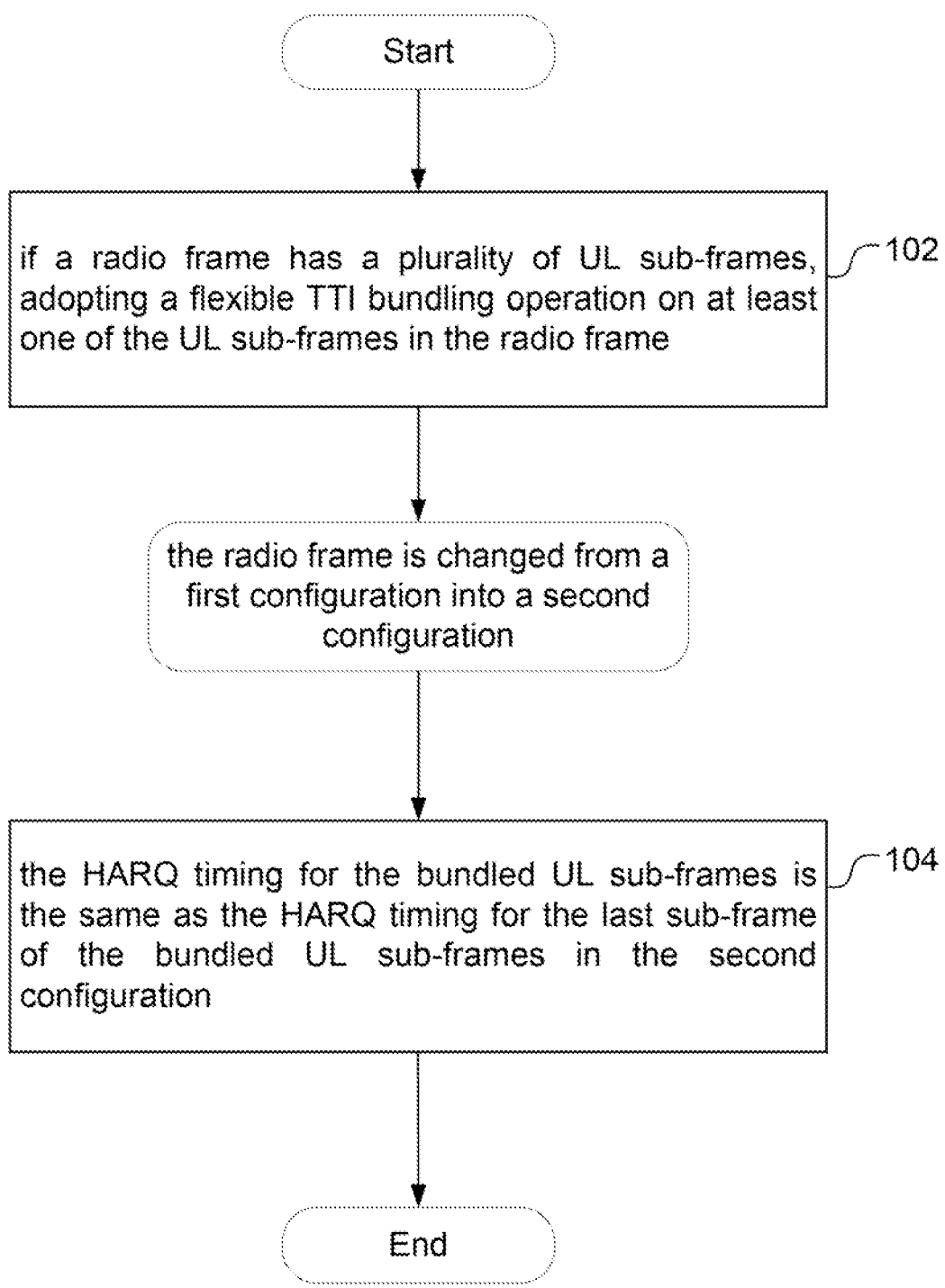
FIG. 1 is a flow chart of a communication method applicable for a LTE TDD system in accordance with one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Please refer to Table 1. Table 1 shows the seven different semi-statically configured DL-UL configurations provided in LTE TDD systems. As shown in Table 1, each radio frame has 10 sub-frames, and each of the sub-frames could be a DL sub-frame, a UL sub-frame or a special sub-frame, in which, "D" denotes the sub-frame is reserved for downlink transmissions, "U" denotes the sub-frame is reserved for uplink transmissions, and "S" denotes a special sub-frame.

TABLE 1

| TDD Configuration | sub-frame number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

It can be observed from Table 1 that there are less than 4 UL sub-frames in configurations 2, 3, 4 and 5. Therefore, configurations 2, 3, 4 and 5 currently do not support TTI bundling. Hence the UL coverage cannot be enhanced by adopting TTI bundling if a UE (user equipment, for example, a mobile device) is operating in configurations 2, 3, 4 and 5.

Reference is made first to FIG. 1. FIG. 1 is a flow chart of a communication method applicable for a LTE TDD system in accordance with one embodiment of the present disclosure.

In step 102, if a radio frame has a plurality of UL sub-frames, adopting a flexible TTI bundling operation on at least one of the UL sub-frames in the radio frame. The term "flexible" means that TTI bundling operation can be adopted even in a TDD configuration with less than 4 UL sub-frames, and the number of sub-frames bundled may vary according to the change of TDD configurations. For example, configuration 2 has two UL sub-frames (sub-frames number 2 and 7) hence a flexible TTI bundling operation on sub-frames number 2 and 7 is adopted in configuration 2.

As another example, configuration 3 has three UL sub-frames (sub-frames number 2, 3 and 4). Therefore, a flexible TTI bundling operation on any two of sub-frames number 2, 3 and 4, or on all of the three sub-frames can be adopted in configuration 3.

As another example, configuration 5 has only one UL sub-frame (sub-frame 5). Although it is not able to bundle multiple UL sub-frames in configuration 5, the flexible TTI bundling operation could still be adopted in configuration 5. On the other hand, if a eNB enables the flexible TTI bundling operation, the eNB preferably avoids adopting configuration 5. The eNB could also suspend the TTI bundling operation when configuration 5 is adopted.

According to another embodiment of the present disclosure, the UL sub-frames bundled in the flexible TTI bundling operation in the radio frame include all of the UL sub-frames in the radio frame. According to yet another embodiment of the present disclosure, the UL sub-frames bundled in the flexible TTI bundling operation in the radio frame include part of the UL sub-frames in the radio frame.

As an example, the flexible TTI bundling operation on sub-frames number 2, 3 and 4 is now adopted in configuration 3 in this embodiment.

In step 104, after the radio frame is changed from a first configuration into a second configuration, the HARQ timing for a eNB (evolved NodeB) to transmit ACK/NACK (Acknowledgmen/Negative-Acknowledgmen) messages for the bundled UL sub-frames is the same as the HARQ timing for the eNB to transmit ACK/NACK messages for the last sub-frame of the bundled UL sub-frames in the second configuration.

Figure 2:
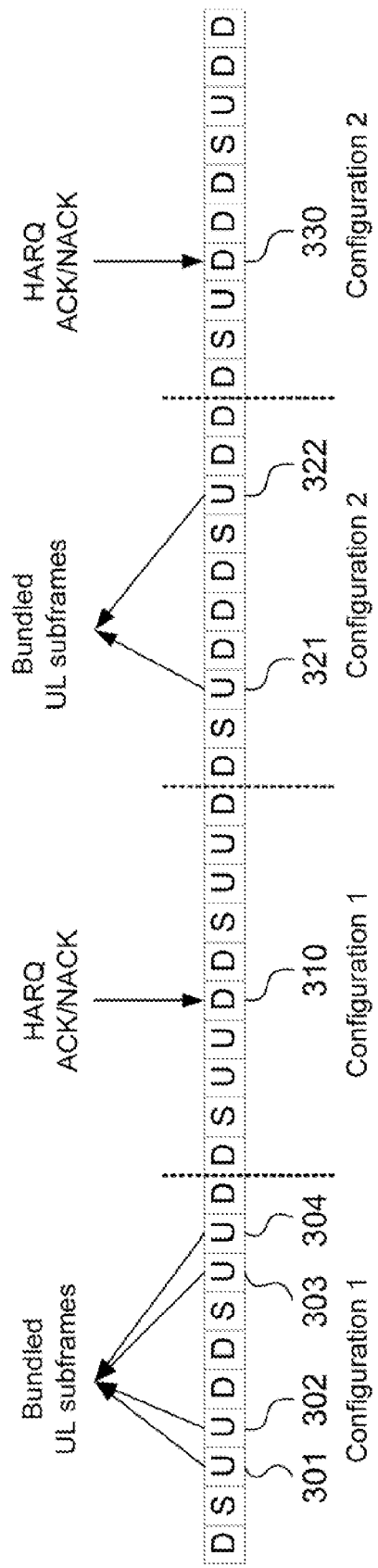
FIG. 2 is a schematic diagram showing the HARQ timing when the radio frame is changed in accordance with an example of one embodiment of the present disclosure.

Please refer to FIG. 2 simultaneously. FIG. 2 is a schematic diagram showing the HARQ timing when the radio frame is changed in accordance with an example of the embodiment illustrated in FIG. 1. In the example shown in FIG. 2, the radio frame is changed from configuration 1 into configuration 2. A flexible TTI bundling operation on UL sub-frames 301, 302, 303 and 304 is adopted in configuration 1, while a flexible TTI bundling operation on sub-frames 321 and 322 is adopted in configuration 2.

Please refer to Table 2 simultaneously. Table 2 shows the parameter k for determining the HARQ timing for each UL sub-frame of the seven different configurations provided in LTE TDD systems. Specifically, the HARQ timing for a sub-frame n in configuration i is at k sub-frames succeed sub-frame n. From UE's perspective, when the UL transmission occurred in the sub-frame n, the HARQ ACK/NACK is then received in the sub-frame n+k.

As an example, the HARQ timing for sub-frame number 2 in configuration 0 is at sub-frame number 6 since sub-frame number 6 succeeds sub-frame number 2 by 4 sub-frames. As another example, the HARQ timing for sub-frame number 7 in configuration 1 is at sub-frame number 1 of the next radio frame since sub-frame number 1 of the next radio frame succeeds sub-frame number 7 by 4 sub-frames. As still another example, the HARQ timing for sub-frame number 8 in configuration 1 is at sub-frame number 4 of the next radio frame since sub-frame number 4 of the next radio frame succeeds sub-frame number 8 by 6 sub-frames. As yet another example, the HARQ timing for sub-frame number 7 in configuration 2 is at sub-frame number 3 of the next radio frame since sub-frame number 3 f the next radio frame succeeds sub-frame number 7 by 6 sub-frames.

TABLE 2

| TDD Configuration | sub-frame number (n) | | | | | | | | | |
|---|---|---|---|---|---|---|---|---|---|---|
| (i) | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | | 4 | 7 |

In the example shown in FIG. 2, sub-frame 304 is the last sub-frame of the bundled UL sub-frames in configuration 1. Therefore, the HARQ timing for the eNB to transmit ACK/NACK messages for the bundled UL sub-frames in configuration 1 is determined according to the sub-frame position of sub-frame 304 (i.e., index or sub-frame number 'n' in Table 2). Since the sub-frame position of sub-frame 304 is sub-frame number 8 in configuration 1, the HARQ timing for sub-frame 304 is at the next 6 sub-frame according to Table 2. Therefore, the HARQ timing for sub-frame 304 is at sub-frame number 4 of the next radio frame (i.e., sub-frame 310).

After the radio frame is changed from configuration 1 into configuration 2, the HARQ timing for the eNB to transmit ACK/NACK messages for the bundled UL sub-frames in configuration 2 is at sub-frame 330. It is noted that sub-frame 330 is the HARQ timing for the last sub-frame 322 of the bundled UL sub-frames in configuration 2. Since the sub-frame position of sub-frame 322 is sub-frame number 7 in configuration 2, the HARQ timing for sub-frame 322 is at the next 6 sub-frame according to Table 2. Therefore, the HARQ timing for sub-frame 322 is at sub-frame number 3 of the next radio frame (i.e., sub-frame 330).

Figure 3:
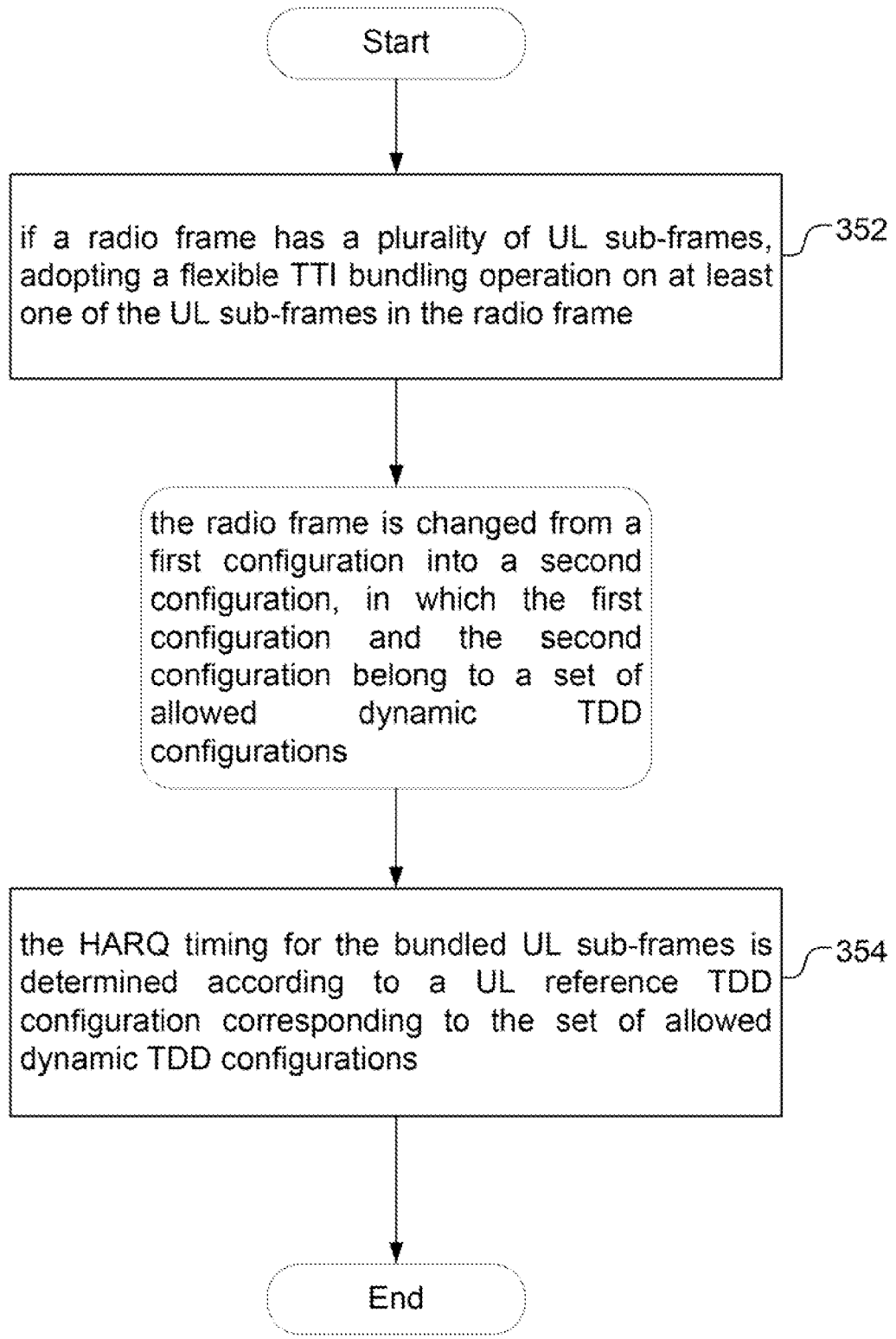
FIG. 3 is a flow chart of a communication method applicable for a LTE TDD system in accordance with one embodiment of the present disclosure.

Reference is made also to FIG. 3. FIG. 3 is a flow chart of a communication method applicable for a LTE TDD system in accordance with yet another embodiment of the present disclosure.

In step 352, if a radio frame has a plurality of UL sub-frames, adopting a flexible TTI bundling operation on at least one of the UL sub-frames in the radio frame. According to another embodiment of the present disclosure, the UL sub-frames bundled in the flexible TTI bundling operation in the radio frame include all of the UL sub-frames in the radio frame. According to yet another embodiment of the present disclosure, the UL sub-frames bundled in the flexible TTI bundling operation in the radio frame include part of the UL sub-frames in the radio frame.

Please refer to Table 3 simultaneously. Table 3 shows the set of allowed dynamic TDD configurations (Bi) and the UL HARQ reference TDD configuration (Ui) corresponding to each of the seven different configurations (i) provided in LTE TDD systems.

TABLE 3

| TDD Configuration (i) | Set of allowed dynamic TDD configurations (Bi) | UL HARQ reference TDD configuration (Ui) |
|---|---|---|
| 0 | 0, 1, 2, 3, 4, 5, 6 | 0 |
| 1 | 1, 2, 4, 5 | 1 |
| 2 | 2, 5 | 2 |
| 3 | 3, 4, 5 | 3 |
| 4 | 4, 5 | 4 |
| 5 | 5 | 5 |
| 6 | 1, 2, 3, 4, 5, 6 | 6 |

As defined in 3GPP, a UL HARQ reference TDD configuration could be determined by selecting a TDD configuration from Bi in which the UL sub-frame(s) is a superset of every TDD configuration in Bi. If there are multiple TDD configurations fulfilling the aforementioned criterion, then the TDD configuration having the least number of UL sub-frames would be chosen as the UL HARQ reference TDD configuration.

In step 354, after the radio frame is changed from a first configuration into a second configuration, in which the first configuration and the second configuration belong to a set of allowed dynamic TDD configurations, the HARQ timing for a eNB to transmit ACKINACK messages for the bundled UL sub-frames is determined according to a UL HARQ reference TDD configuration corresponding to the set of allowed dynamic TDD configurations.

In one embodiment of the present disclosure, the HARQ timing for the eNB to transmit ACK/NACK messages for the abovementioned bundled UL sub-frames is the same as the HARQ timing for the eNB to transmit ACK/NACK messages for the last sub-frame of the bundled UL sub-frames in the UL HARQ reference TDD configuration corresponding to the set of allowed dynamic TDD configurations.

Figure 4A:
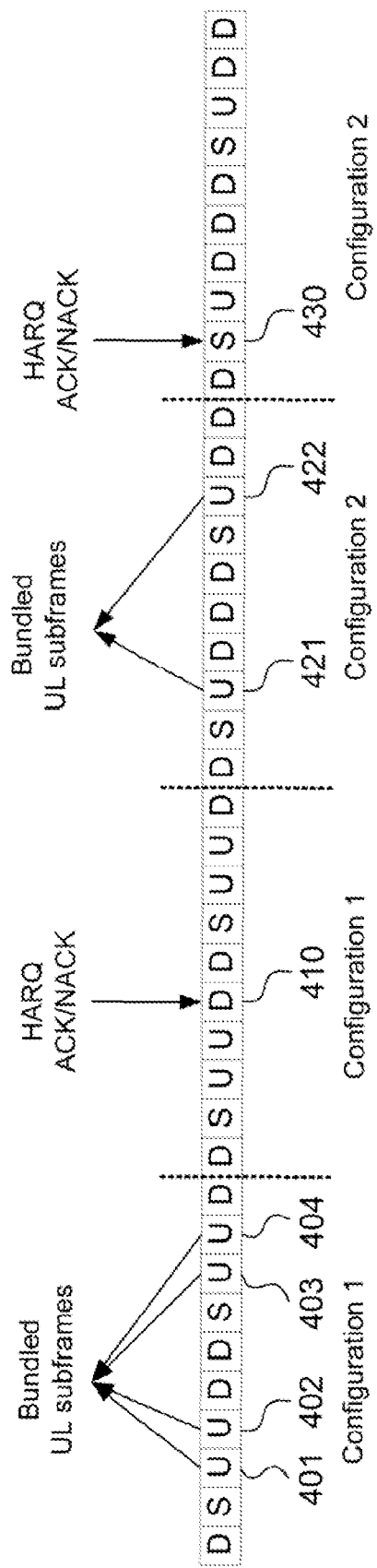
FIG. 4A is a schematic diagram showing the HARQ timing when the radio frame is changed in accordance with an example of one embodiment of the present disclosure.

Please refer to FIG. 4A simultaneously. FIG. 4A is a schematic diagram showing the HARQ timing when the radio frame is changed in accordance with an example of the embodiment illustrated in FIG. 3. In the example shown in FIG. 4A, the radio frame is changed from configuration 1 into configuration 2 (configuration 1 and configuration 2 belong to the set of allowed dynamic TDD configurations B1, which includes configurations 1, 2, 4 and 5). It is noted that the UL HARQ reference TDD configuration U1 corresponding to the set of allowed dynamic TDD configurations B1 is TDD configuration 1.

A flexible TTI bundling operation on UL sub-frames 401, 402, 403 and 404 is adopted in configuration 1, while a flexible TTI bundling operation on sub-frames 421 and 422 is adopted in configuration 2. In configuration 1, the HARQ timing for the eNB to transmit ACK/NACK messages for the bundled UL sub-frames is at sub-frame 410.

After the radio frame is changed from configuration 1 into configuration 2, the HARQ timing for the eNB to transmit ACK/NACK messages for the bundled UL sub-frames in configuration 2 is determined according to the UL HARQ reference TDD configuration U1 (i.e., TDD configuration 1) corresponding to the set of allowed dynamic TDD configurations B1.

Specifically, the last sub-frame (422) of the bundled UL sub-frames in configuration 2 is sub-frame number 7, and the UL HARQ reference TDD configuration U1 corresponding to B1 is TDD configuration 1. According to Table 2, the HARQ timing for sub-frame 422 is at the next 4 sub-frame. Therefore, the HARQ timing for the bundled UL sub-frames in configuration 2 is at sub-frame number 1 (sub-frame 430) of the next radio frame.

According to yet another embodiment of the present disclosure, the HARQ timing for flexible TTI bundling only depends on the UL HARQ reference TDD configuration and is independent of which TDD configuration is switched to. The HARQ timing for a eNB to transmit ACK/NACK messages for the bundled UL sub-frames is determined according to the UL HARQ reference TDD configuration and the last UL sub-frame of the UL HARQ reference TDD configuration.

Figure 4B:
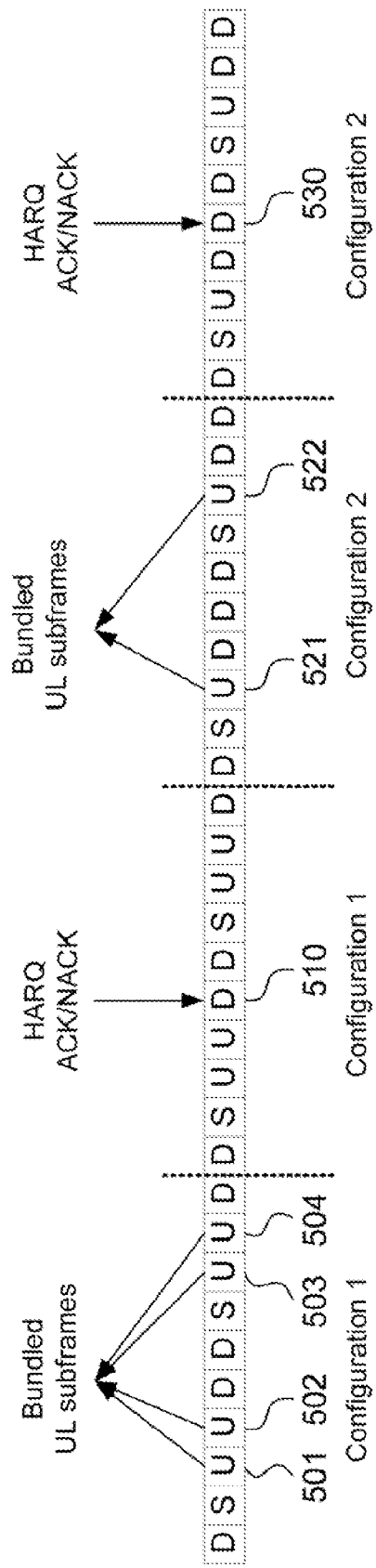
FIG. 4B is a schematic diagram showing the HARQ timing when the radio frame is changed in accordance with an example of one embodiment of the present disclosure.

Please refer to FIG. 4B simultaneously. FIG. 4B is a schematic diagram showing the HARQ timing when the radio frame is changed in accordance with an example of the embodiment illustrated in FIG. 3. In the example shown in FIG. 4B, the radio frame is changed from configuration 1 into configuration 2 (configuration 1 and configuration 2 belong to the set of allowed dynamic TDD configurations B1, which includes configurations 1, 2, 4 and 5). It is noted that the UL HARQ reference TDD configuration U1 corresponding to the set of allowed dynamic TDD configurations B1 is TDD configuration 1.

A flexible TTI bundling operation on UL sub-frames 501, 502, 503 and 504 is adopted in configuration 1, while a flexible TTI bundling operation on sub-frames 521 and 522 is adopted in configuration 2. In configuration 1, the HARQ timing for the eNB to transmit ACK/NACK messages for the bundled UL sub-frames is at sub-frame 510.

After the radio frame is changed from configuration 1 into configuration 2, the HARQ timing for the eNB to transmit ACK/NACK messages for the bundled UL sub-frames in configuration 2 is determined according to the UL HARQ reference TDD configuration U1 (i.e., TDD configuration 1) corresponding to the set of allowed dynamic TDD configurations B1.

Specifically, since the UL HARQ reference TDD configuration is configuration 1, the HARQ timing for the UL HARQ reference TDD configuration is determined according to configuration 1 and sub-frame number 8 (i.e. the last UL sub-frame in configuration 1). According to Table 2, the HARQ timing for sub-frame number 8 in configuration 1 is at the next 6 sub-frame. Therefore, the HARQ timing for the bundled UL sub-frames in configuration 2 is at sub-frame number 4 (sub-frame 530) of the next radio frame.

In other words, no matter how the TDD configuration is switched among the set of allowed dynamic TDD configurations (configurations 1, 2, 4, and 5), the HARQ timing for the bundled UL sub-frames is fixed at sub-frame number 4 of the next radio frame.

Figure 5:
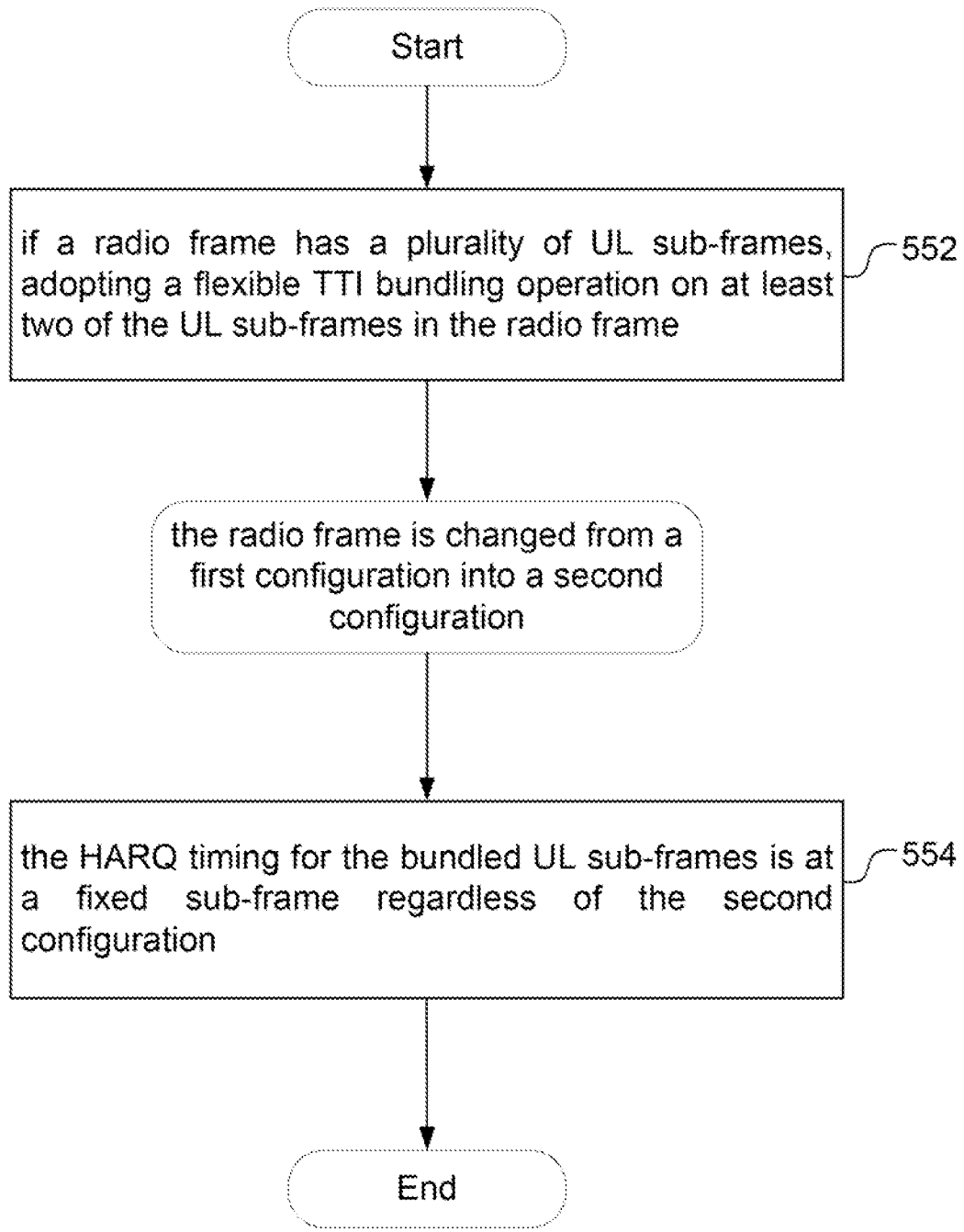
FIG. 5 is a flow chart of a communication method applicable for a LTE TDD system in accordance with one embodiment of the present disclosure.

Reference is further made to FIG. 5. FIG. 5 is a flow chart of a communication method applicable for a LTE TDD system in accordance with still another embodiment of the present disclosure.

In step 552, if a radio frame has a plurality of UL sub-frames, adopting a flexible TTI bundling operation on at least one of the UL sub-frames in the radio frame. According to another embodiment of the present disclosure, the UL sub-frames bundled in the flexible TTI bundling operation in the radio frame include all of the UL sub-frames in the radio frame. According to yet another embodiment of the present disclosure, the UL sub-frames bundled in the flexible TTI bundling operation in the radio frame include part of the UL sub-frames in the radio frame.

In step 554, when the radio frame is changed from a first configuration into a second configuration, the HARQ timing for a eNB to transmit ACK/NACK messages for the bundled UL sub-frames is at a fixed sub-frame regardless of the second configuration.

According to one embodiment of the present disclosure, the HARQ timing for the eNB to transmit ACK/NACK messages for the abovementioned bundled UL sub-frames is at the sixth sub-frame (i.e., sub-frame number 5) of the second configuration.

In other words, in this embodiment, the HARQ timing for the eNB to transmit ACK/NACK messages for the bundled UL sub-frames is fixed at sub-frame number 5, which is independent of the current TDD configuration.

Figure 6:
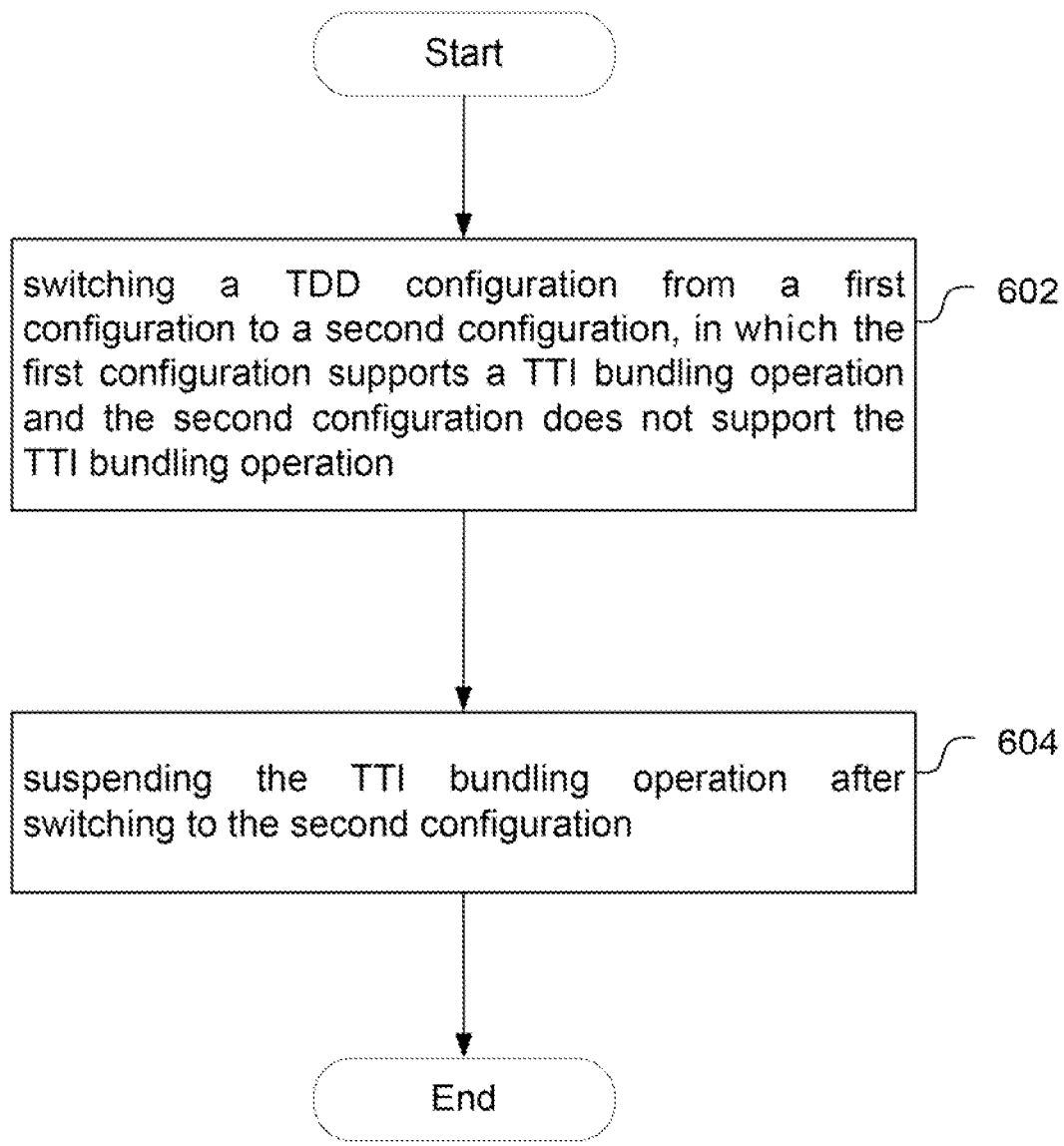
FIG. 6 is a flow chart of a communication method applicable for a LTE TDD system in accordance with one embodiment of the present disclosure.

Reference is now made to FIG. 6. FIG. 6 is a flow chart of a communication method applicable for a LTE TDD system in accordance with yet another embodiment of the present disclosure.

In step 602, a TDD configuration is switched from a first configuration to a second configuration, in which the first configuration supports a TTI bundling operation and the second configuration does not support the TTI bundling operation.

In step 604, the TTI bundling operation is suspended after the TDD configuration is switched to the second configuration.

For example, if the TDD configuration is switched from configuration 1 (which supports TTI bundling operation) into configuration 4 (which does not support TTI bundling operation according to 3GPP Rel-11), then the TTI bundling operation is suspended in configuration 4.

Figure 7:
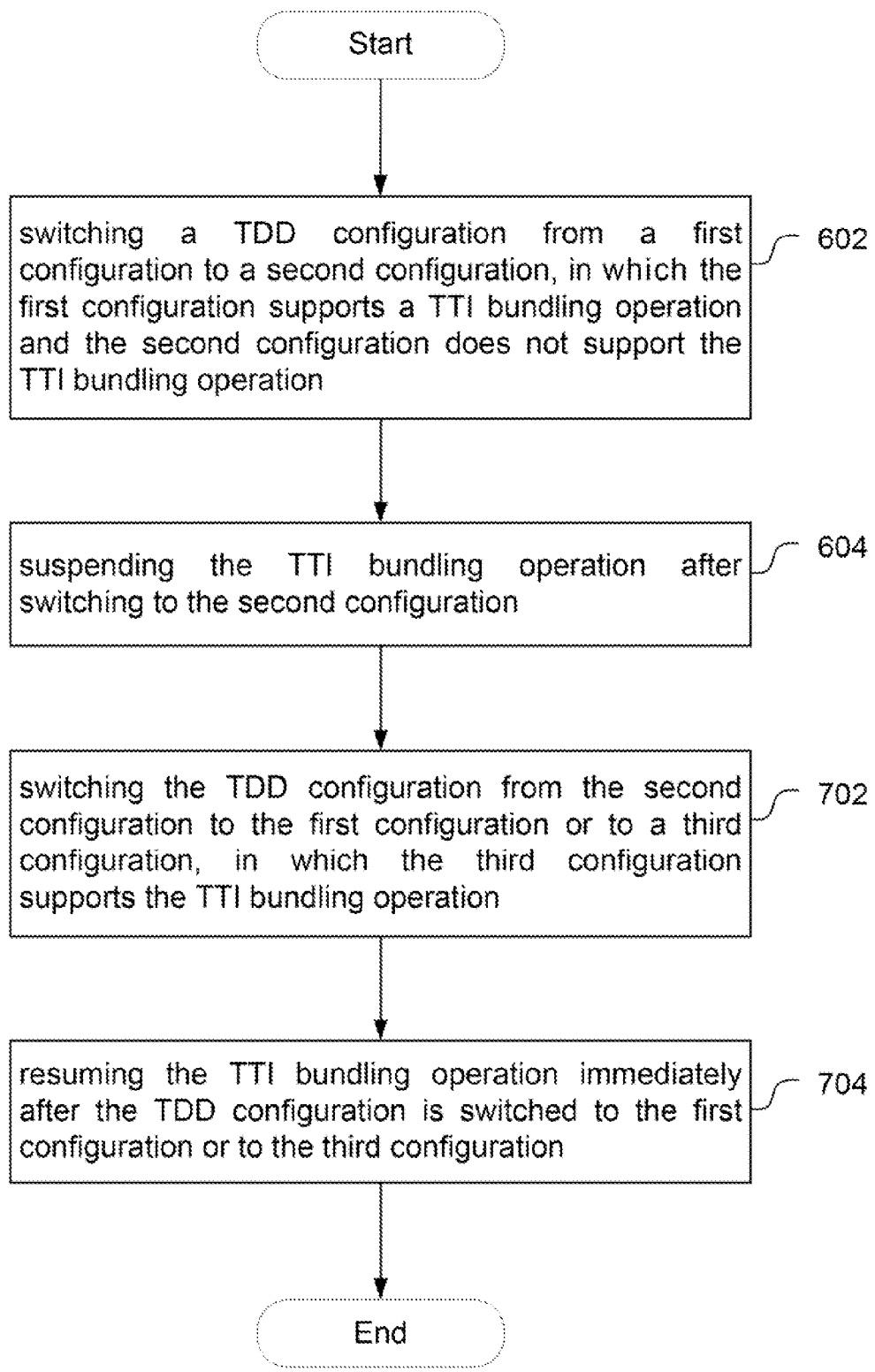
FIG. 7 is a flow chart of a communication method applicable for a LTE TDD system in accordance with one embodiment of the present disclosure.

Reference is further made to FIG. 7. FIG. 7 is a flow chart of a communication method applicable for a LTE TDD system in accordance with still another embodiment of the present disclosure. Compared with the communication method illustrated in FIG. 6, the communication method illustrated in FIG. 7 further includes steps 702 and 704.

In step 702, the TDD configuration is switched from the second configuration to the first configuration or to a third configuration, in which the third configuration supports the TTI bundling operation.

In step 704, the TTI bundling operation is resumed immediately after the TDD configuration is switched to the first configuration or to the third configuration.

Following the previous example made in the embodiment corresponding to FIG. 6, if the TDD configuration is switched from configuration 4 to configuration 1, then the TTI bundling operation is resumed immediately after the TDD configuration is switched from configuration 4 to configuration 1.

Figure 8:
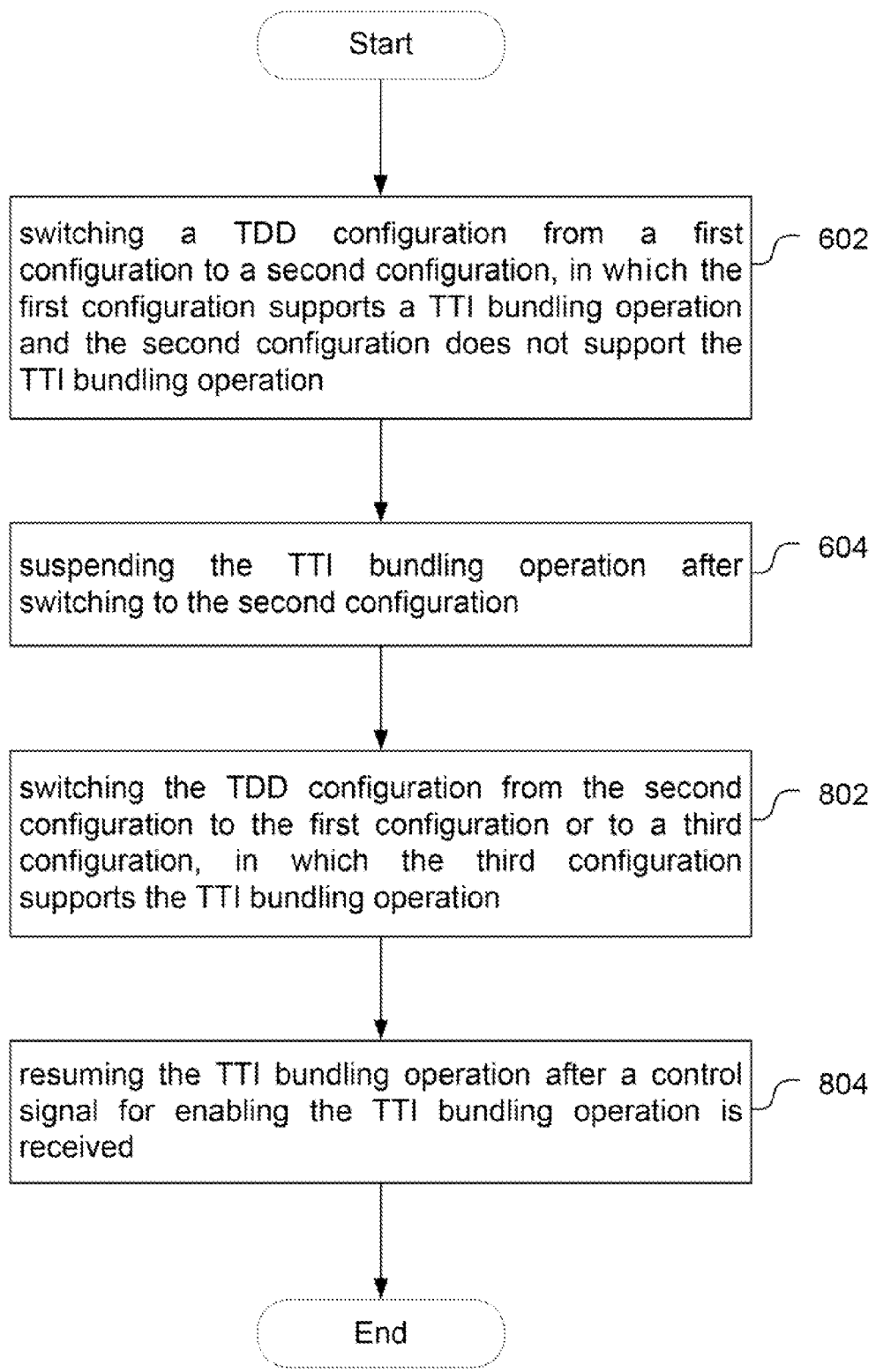
FIG. 8 is a flow chart of a communication method applicable for a LTE TDD system in accordance with one embodiment of the present disclosure.

Reference is further made to FIG. 8. FIG. 8 is a flow chart of a communication method applicable for a LTE TDD system in accordance with yet another embodiment of the present disclosure. Compared with the communication method illustrated in FIG. 6, the communication method illustrated in FIG. 8 further includes steps 802 and 804.

In step 802, the TDD configuration is switched from the second configuration to the first configuration or to a third configuration, in which the third configuration supports the TTI bundling operation.

In step 804, the TTI bundling operation is resumed after a control signal for enabling the TTI bundling operation is received. The control signal can be a RRCConnectionReconfiguration message, but is not limited herein.

Following the previous example made in the embodiment corresponding to FIG. 6, if the TDD configuration is switched from configuration 4 to configuration 1, the TTI bundling operation is resumed after a control signal for enabling the TTI bundling operation is received.

The above illustrations include exemplary operations, but the operations are not necessarily performed in the order shown. Operations may be added, replaced, changed order, and/or eliminated as appropriate, in accordance with the spirit and scope of various embodiments of the present disclosure.

By applying the techniques disclosed in the present disclosure, a flexible TTI bundling operation can be adopted to improve the enhancing UL coverage for the UE even when the UE is operating in the TDD configurations that do not support TTI bundling in 3GPP Rel-11. Moreover, the degradation of transmission performance due to HARQ timing mismatches when eIMTA users dynamically switch among different TDD configurations is also resolved.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A communication method applicable for a LTE TDD system, comprising:

if a radio frame with one of seven TDD configurations has a plurality of UL sub-frames, adopting a flexible TTI bundling operation on at least two of the plurality of the UL sub-frames in the radio frame, the at least two UL sub-frames being bundled together as a group for transmitting the same physical data; and after the radio frame is changed from a first configuration into a second configuration, wherein the first configuration and the second configuration are selected from the seven TDD configurations, and seven sets of allowed dynamic TDD configurations are defined respectively corresponding to each of the seven TDD configurations, wherein, if the first configuration and the second configuration belong to the set of allowed dynamic TDD configurations corresponding to the first configuration, the HARQ timing for a eNB to transmit ACK/NACK messages for the bundled UL sub-frames is determined according to a UL HARQ reference TDD configuration corresponding to the set of allowed dynamic TDD configurations, the UL HARQ reference TDD configuration is determined by selecting one TDD configuration from the set of allowed dynamic TDD configurations corresponding to the first configuration, and at least one UL sub-frame in the UL HARQ reference TDD configuration is a superset of all TDD configurations in the set of allowed dynamic TDD configurations corresponding to the first configuration.

2. The communication method of claim 1, wherein the HARQ timing for a eNB to transmit ACK/NACK messages for the bundled UL sub-frames is determined according to the UL HARQ reference TDD configuration and the last UL sub-frame of the second configuration.

3. The communication method of claim 1, wherein the HARQ timing for a eNB to transmit ACK/NACK messages for the bundled UL sub-frames is determined according to the UL HARQ reference TDD configuration and the last UL sub-frame of the UL HARQ reference TDD configuration.

4. The communication method of claim 1, wherein the UL sub-frames bundled in the flexible TTI bundling operation in the radio frame comprises all of the UL sub-frames in the radio frame.

* * * * *